Dec. 24, 1968 J. M. SIPRESS ETAL 3,418,631

ERROR DETECTION IN PAIRED SELECTED TERNARY CODE TRAINS

Filed June 4, 1965 2 Sheets-Sheet 1

INVENTORS J. M. SIPRESS
E. ZARINS

BY Leonard W. Arnold

ATTORNEY

ERROR DETECTION IN PAIRED SELECTED TERNARY CODE TRAINS

Filed June 4, 1965 2 Sheets-Sheet 2

United States Patent Office 3,418,631

Patented Dec. 24, 1968

3,418,631

ERROR DETECTION IN PAIRED SELECTED TERNARY CODE TRAINS

Jack M. Sipress, Summit, and Egils Zarins, East Orange, N.J., assignors to Bell Telephone Laboratories, Incorporated, New York, N.Y., a corporation of New York Filed June 4, 1965, Ser. No. 461,381

3 Claims. (Cl. 340—146.1)

This invention relates to pulse code modulation (PCM) and more particularly to the detection and measurement of errors in a specially constrained code.

The specially constrained code with which we are here concerned is the so-called paired selected ternary (PST) code disclosed in copending application, Ser. No. 335,014, filed by J. M. Sipress on Jan. 2, 1964, now Patent No. 3,302,193. In accordance with that invention, a binary pulse signal is converted into a three state signal of positive pulses negative pulses and spaces in accordance with a first predetermined code set until a three state signal is generated having a predetermined direct current component, whereupon the conversion is accomplished in accordance with a second predetermined code set until a three state signal having a second predetermined direct current component is generated and the conversion again carried out in accordance with the first code. The resulting code comprising two code sets insures that as a result of the conversion the resulting three state signal has no direct current component and that a long train of spaces will not be transmitted, thus facilitating the use of self-timed repeaters in a PCM system.

More specifically, the input signal is divided into words of two bits each which are then encoded into three level signals in accordance with either of two codes shown below:

| Binary word | Code No. 1 | Code No. 2 |
|---|---|---|
| 1, 1 | +1, −1 | +1, −1 |
| 1, 0 | +1, 0 | −1, 0 |
| 0, 1 | 0, +1 | 0, −1 |
| 0, 0 | −1, +1 | −1, +1 |

The conversion from binary code to the three level code is accomplished by first dividing the binary input signal into successive two-bit words which are then converted in accordance with code number 1. When a code word, the algebraic sum of the amplitude of whose bits is +1 unit, is generated in accordance with code number 1 (i.e., for binary words 1, 0 or 0, 1), the equipment, after generating the code word, switches over to convert the binary words to three level code words in accordance with code number 2. The generation of a word in accordance with code number 2 whose sum is −1 unit (i.e., for binary words 1, 0 or 0, 1) causes the equipment to switch back to the use of code number 1. Because the equipment switches from one code to the other in response to a generated code word, the alegbraic sum of the amplitudes of whose bits is not zero (either +1 or −1), the resulting output signal has no direct current component. As a result, there is no drift of the direct current level to make regeneration difficult. In addition, and most important to the transmission of digital information over a transmission system employing self-timed repeaters, is the fact that the resulting pulse train cannot contain more than two consecutive spaces.

As it is true with other codes, the fact that the transmitted code is of the paired selected ternary type does not, of course, render it immune from errors. Thus, for example, spurious signals, such as noise bursts, may be added to the paired selected ternary pulse train during transmission from one point to another, and thereby alter the information content of the pulse train. It is important in the installation and maintenance of PCM systems to be able to detect and measure errors in the code, and an error detector, capable of making this detection should, ideally, be capable of checking system performance without requiring an interruption of normal communications. In addition, such an error detector should be capable of checking system performance between any two points of the transmission system and should be capable of modifying the received signal prior to retransmission so that an error detector located further along the transmission system will not detect any errors save those introduced in transmission between it and the preceding detector. It is the primary object of this invention to accomplish these ends.

In accordance with this invention, errors are detected and the retransmitted pulse train is modified by removing all the +1, −1 and −1, +1 words from the received pulse train examining the resulting signal for bipolar violations, and regenerating the signal with the detected bipolar violations removed. Because the received signal is regenerated only with the detected bipolar violations removed, the signal retransmitted along the transmission medium is free of violations. Thus, when the signal is received by another error detector further along the transmission medium it will contain only those violations due to errors introduced in the signal in the transmission path between error detectors.

This invention will be more fully comprehended from the following detailed description taken in conjunction with the drawings in which.

The paired selected ternary code (PST) signal disclosed in the above-mentioned copending patent application has the property that if the PST words +1, −1 and −1, +1 are removed from the pulse train, the signals remaining are bipolar in nature. That is to say, each mark of the pulse train remaining after removal of the +1, −1 and −1, +1 words from the PST signal has a polarity which is opposite that of the immediately preceding mark. This property may be most easily understood by referring to FIG. 1. In line (*a*) of FIG. 1 a typical binary signal divided into words of two bits each is depicted by the conventional notation wherein a mark is denoted by a "1" and a space by a "0." In line (*b*) the resulting PST signal encoded in accordance with the teaching of the above-mentioned copending patent application is depicted wherein a "+1" represents a positive mark, a "−1" a negative mark, and a "0" represents a space. The actual PST pulse signal is shown in line (*c*) of FIG. 1, and if the words +1, −1 and −1, +1 are removed from the pulse signal shown in line (*c*) the remaining signal is shown in line (*d*). It is immediately apparent from the pulse signals shown in line (*d*) that the remaining pulse train has the property that each mark is of a polarity opposite that of the immediately preceding mark, and it is this property which is monitored by apparatus embodying this invention to detect violations resulting from errors in the transmitted PST signal.

Figure 1:
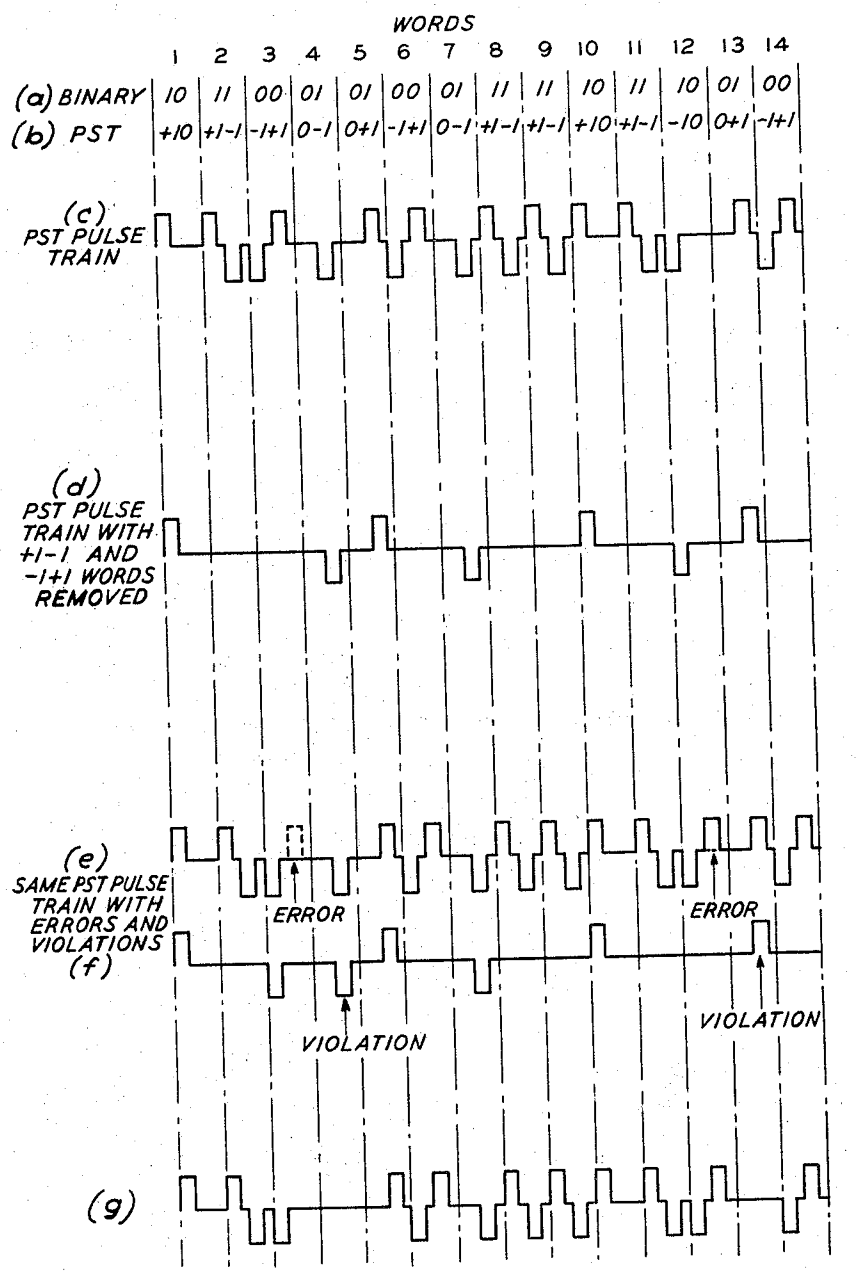
FIG. 1 is a series of waveforms useful in understanding the principles of this invention.

In line (*e*) of FIG. 1 the same PST signal shown in line (*c*) is depicted with two errors introduced due to transmission error. The first error occurs during the third word of the PST signal and is due to the deletion of a positive mark in the second time slot of the third word. The second illustrative error occurs in the twelfth PST word and is due to the insertion of a positive mark in the second time slot of the twelfth word when no positive mark was transmitted during that time slot. The effects of these two errors are shown in line (*f*) which is the same signal shown in line (*e*) with the PST words +1, −1 and −1, +1 removed. As a result of the removal of these words, and the deletion of the positive mark in the second time slot of the third PST word through transmission error, the negative going mark in the first time slot of the third word now appears in the signal shown in line (*f*), whereas it did not appear in the signal shown in line (*d*). In addition, due to the addition of a positive mark in the second time slot of the twelfth word, the twelfth word is now −1, +1 and is removed from the signal. This, obviously, causes the removal of the negative mark in the first time slot of the twelfth word.

As a result of the transmission error in the third word, the negative mark in the third word is now followed by the negative mark in the fourth word of the signal shown in line (*f*). This constitutes a violation of the property that the PST signal with the words −1, +1 and +1, −1 removed must be bipolar in nature. Similarly, the positive mark in the tenth word is now followed by the positive mark of the thirteenth word of the signal shown in line (*f*) which again is a violation of the bipolar property of the signal and is, of course, due to the insertion, due to transmission error, of a positive mark in the second time slot of the twelfth word.

Figure 2:
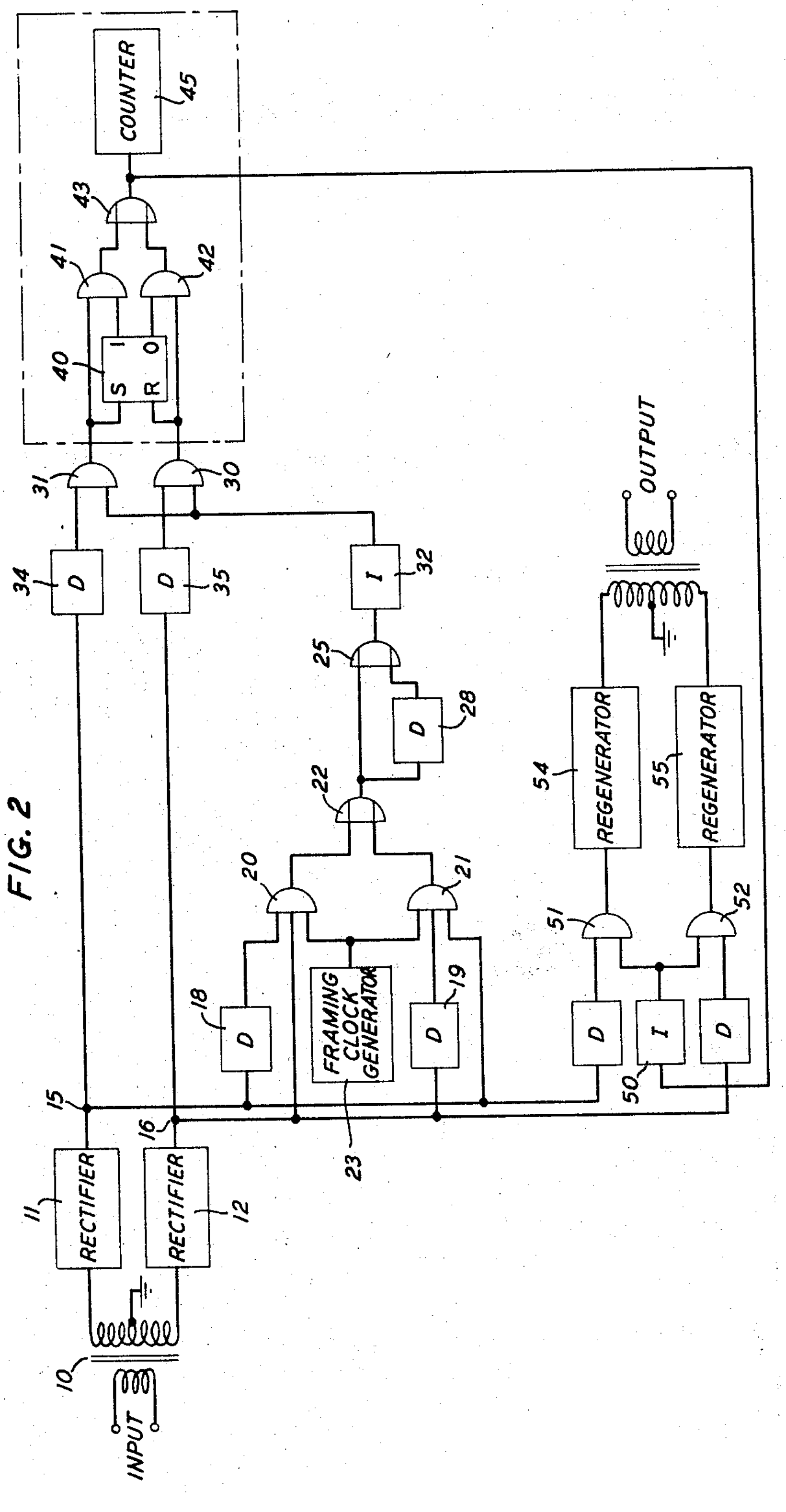
FIG. 2 is a block diagram of an illustrative embodiment of this invention.

Apparatus in accordance with this invention which operates to detect transmission errors by removing all +1, −1 and −1, +1 words from the received PST pulse train and examines the remaining signal for bipolar violations is shown in FIG. 2. The transmitted PST signal is applied to an input transformer 10 having a center tapped output winding and whose output terminals are connected to rectifiers 11 and 12. As is well known in the art, such an arrangement will result in a positive mark being generated at output terminal 15 of rectifier 11 for each received positive PST mark, and a positive mark being generated at output terminal 16 of rectifier 12 for each received negative PST mark.

Apparatus to detect the presence of +1, −1 and −1, +1 words in the received PST signal comprises delay circuits 18 and 19, AND gates 20 and 21, OR gate 22 and framing clock generator 23 which may be that described in the above mentioned copending application. Delay circuit 18, together with the framing clock generator 23, function to produce an output signal from AND gate whenever the word +1, −1 occurs. To accomplish this function, the output terminal 15 of rectifier 11 is connected by means of delay circuit 18, which provides a delay of one time slot, to one input terminal of AND gate 20. A second input terminal of AND gate 20 is connected to output terminal 16 of rectifier 12, and the AND gate is enabled by the output signal from framing clock generator 23 during the second time slot of each word. If the word +1, −1 is received, then AND gate 20 is enabled by the delayed positive mark at terminal 15 due to the received +1 in the first time slot of the word and the positive mark at terminal 16 due to the −1 in the second time slot of the word. As a result, AND gate 20 produces an output signal, which is transmitted through OR gate 22, is indicative of the fact that the word +1, −1 has been received. Similarly, if the word −1, +1 is received, then the delayed output signal from rectifier 12 applied to AND gate 21 through delay circuit 19, the output signal from rectifier 11 and that from the framing clock generator combine to enable AND gate 21 whose output is also transmitted through OR gate 22. Thus, whenever either of the PST words +1, −1 or −1, +1 is received, an output signal is produced from OR gate 22.

The output signal from OR gate 22 is used to remove the words −1, +1 and +1, −1 from the received PST signal so that the remaining signal may be examined for violations of the bipolar property. Since the output signal from OR gate 22 is one time slot in duration, it first is made to occur for an interval of two time slots by applying it directly to a first input terminal of OR gate 25 and also to a second input terminal of OR gate 25 by means of a one time slot delay circuit 28. As is obvious, the result of this circuit configuration is that OR gate 25 produces an output signal for two time slots following the detection of the PST words +1, −1 and −1, +1 in the received signal. To remove these words from the received signal, the output signal from OR gate 25 is connected to AND gates 30 and 31 by means of an inverter circuit 32, which may be that described on page 401 of "Pulse and Digital Circuits" by Millman & Taub, published by McGraw-Hill Book Co., 1956. The inverter circuit serves to invert the polarity of the output signal from OR gate 25 so that when a signal is present at the output terminal of OR gate 25 indicating the reception of the words +1, −1 or −1, +1, a ground voltage is produced by inverter circuit 32 which serves to disable AND gates 30 and 31.

The output signals from rectifier 11 which represent positive going PST pulses are applied by means of a one time slot delay circuit 34 to AND gate 31, while the pulses at terminal 16 representing negative going PST pulses are applied by a one time slot delay circuit 35 to AND gate 30. Since AND gates 30 and 31 are inhibited for a one word time interval beginning upon the occurrence of the second bit of each of the words +1, −1 and −1, +1, and the PST signals are applied to AND gates 30 and 31 with a one time slot delay, the result is that AND gates 30 and 31 are inhibited during the presence of the words +1, −1 and −1, +1. The result, of course, is the removal of those words from their outputs leaving the remainder of the PST signal. Because of the removal of the +1, −1 and −1, +1 words the outputs of AND gates 31 and 30, in the absence of transmission error, alternate in generating marks so that the resulting signal is bipolar in nature. That is to say, if AND gate 31 produces a first mark, then AND gate 30 will produce the next mark.

Because of the bipolar nature of the signals generated by AND gates 31 and 30, namely, that they alternate in generating marks, a bipolar violation detector such as that shown on page 77 of the January 1962 issue of the "Bell System Technical Journal" may be used to detect errors by detecting the failure of AND gates 30 and 31 to alternate in producing marks. The operation of this bipolar violation circuit which comprises a bistable circuit 40, AND gates 41 and 42 and an OR gate 43 is most straightforward. The bistable circuit 40 is connected so that it is set by a mark from AND gate 31 and reset by a mark from AND gate 30. AND gate 41 is connected to receive the positive marks from AND gate 31 and is also connected to the "1" output terminal of bistable circuit 40. Thus, a first mark from AND gate 31 sets the bistable circuit 40 and enables AND gate 41. If AND gate 31 produces the next occurring mark AND gate 41 produces an output signal which is transmitted by OR gate 43 to a counter indicating that a violation has occurred. This violation is, of course, due to the fact that the signal should be bipolar in nature and AND gate 31 should not produce two consecutive marks. If there had been no error, then the next occurring mark would have emanated from AND gate 30 which would have reset bistable circuit 40 and disabled AND gate 41. Similarly, if two negative marks occur consecutively, AND gate 42 is enabled by the first, due to the fact that it serves to reset bistable circuit 40, and will transmit the second to OR gate 43. Thus, each violation of the bipolar property, which can only be due to a transmission error, is counted by counter 45, which provides an indication of the error rate.

In addition to recording the error rate of the transmitted PST signal in accordance with this invention the received signal is regenerated with violations removed so that a subsequent error detector will detect only violations introduced between itself and the preceding error detector. To accomplish such regeneration, wherein violations are removed from the PST signal, the output signal from OR gate 43 is applied to inverter circuit 50 which produces a ground voltage to inhibit AND gates 51 and 52 whenever a violation is detected. AND gates 51 and 52 are conductive, in the absence of error, due to the fact that inverter circuit 50 produces an enabling voltage when there is a ground voltage at the output of OR gate 43. These AND gates 51 and 52, in the absence of error, serve to conduct the signals from terminals 15 and 16, respectively, to regenerator circuits 54 and 55. A delay is introduced in the signals at terminals 15 and 16 prior to their application to AND gates 51 and 52 so that an inhibiting signal from OR gate 43 will serve to remove those marks shown in line (*f*) of FIG. 4 which constitute a violation of the bipolar property of the transmitted PST signal. For the illustrative example the retransmitted signal is as shown in line (*g*) of FIG. 1.

Thus, in accordance with this invention the PST signal is monitored for errors by detecting violations of the bipolar property of the signal which remains when the words +1, −1 and −1, +1 are removed from the signal. In addition, the retransmitted signal is free of violations due to the fact that the received pulses which violate this property are not regenerated. As a result, system performance between any two points may be easily checked.

It is to be understood that the above-described embodiment is merely illustrative of the application of the invention. Numerous other arrangements may be devised by those skilled in the art without departing from the spirit and scope of the invention.

What is claimed is:

1. In a pulse communication system wherein a train of unipolar marks and spaces is converted into three state signals of positive marks, negative marks, and spaces so that the number of consecutive spaces is not more than two by first dividing the unipolar pulse signals into two bit binary words and then encoding these binary words in accordance with the following code

| Binary word | Code No. 1 | Code No. 2 |
|---|---|---|
| 1, 1 | +1, −1 | +1, −1 |
| 1, 0 | +1, 0 | −1, 0 |
| 0, 1 | 0, +1 | 0, −1 |
| 0, 0 | −1, +1 | −1, +1 |

said encoding being done in accordance with code number 1 until a three state signal the algebraic sum of the amplitude of whose bits is +1 is generated whereupon said encoding is accomplished in accordance with code number 2 until a three state signal the algebraic sum of the amplitude of whose bits is −1 is generated whereupon said conversion is again accomplished in accordance with code number 1, apparatus for receiving an input signal of positive marks, negative marks, and spaces encoded in accordance with said code for detecting errors and removing violations therein comprising, means to remove the words +1, −1 and −1, +1 from said received input signal, means to detect bipolar violations in the signal remaining after removal of said words +1, −1 and −1, +1 from said received input signal, regenerator means connected to receive said input signal, and means connected to said regenerator means to inhibit said regenerator means when a bipolar violation is detected so that said received signal is regenerated with the bipolar violations removed.

2. In a pulse communication system wherein a train of unipolar marks and spaces is converted into three state signals of positive marks, negative marks, and spaces so that the number of consecutive spaces is not more than two by first dividing the unipolar pulse signals into two bit binary words and then encoding these binary words in accordance with the following code

| Binary word | Code No. 1 | Code No. 2 |
|---|---|---|
| 1, 1 | +1, −1 | +1, −1 |
| 1, 0 | +1, 0 | −1, 0 |
| 0, 1 | 0, +1 | 0, −1 |
| 0, 0 | −1, +1 | −1, +1 |

said encoding being done in accordance with code number 1 until a three state signal the algebraic sum of the amplitude of whose bits is +1 is generated whereupon said encoding is accomplished in accordance with code number 2 until a three state signal the algebraic sum of the amplitude of whose bits is −1 is generated whereupon said conversion is again accomplished in accordance with code number 1, apparatus for receiving an input signal of positive marks, negative marks, and spaces encoded in accordance with said code for detecting errors and removing violations therein comprising, first gating means for detecting the presence of the words +1, −1 and −1, +1 in said received input signal and to remove said words from said input signal, a bipolar violation detector connected to receive said received input signal from said first gating means with said words +1, −1 and −1, +1 removed, second gating means connected to receive said input signal and the output signal from said bipolar violation detector and to generate an output mark only when an input mark is present and there is no output from said bipolar violation detector, and regenerator means connected to the output of said second gating means.

3. In a pulse communication system wherein a train of unipolar marks and spaces is converted into three state signals of positive marks, negative marks, and spaces so that the number of consecutive spaces is not more than two by first dividing the unipolar pulse signals into two bit binary words and then encoding these binary words into two bit three state signal words in accordance with the following code

| Binary word | Code No. 1 | Code No. 2 |
|---|---|---|
| 1, 1 | +1, −1 | +1, −1 |
| 1, 0 | +1, 0 | −1, 0 |
| 0, 1 | 0, +1 | 0, −1 |
| 0, 0 | −1, +1 | −1, +1 |

said encoding being done in accordance with code number 1 until a three state signal word the algebraic sum of the amplitude of whose bits is +1 is generated whereupon said encoding is accomplished in accordance with code number 2 until a three state signal word the algebraic sum of the amplitude of whose bits is −1 is generated whereupon said conversion is again accomplished in accordance with code number 1, apparatus for receiving an input signal of positive marks, negative marks, and spaces encoded in accordance with said code for detecting errors and removing violations therein comprising, in combination, a framing clock generator to generate a mark in the second time slot of each three state signal word, first gating means to detect the presence of the word +1, −1 comprising, an AND gate having three input terminals, a first of which is connected to receive a positive input mark delayed by one time slot of the input signal, a second of which is connected to receive a negative input mark and a third of which is connected to receive a clock signal from said framing clock generator during the second time slot of each received word, second gating means for detecting the presence of the word −1, +1 in the input signal comprising, an AND gate having three input terminals, a first of which is connected to receive a negative input mark delayed by one time slot, a second of which is connected to receive a positive input mark, and a third of which is connected to receive a clock signal from said framing clock generator during the second time slot of each received word, a third and a fourth AND gates, each of which is connected to receive an inhibiting signal during both time slots of a word of the input signal, first one time slot delay means connected to receive positive input marks and to transmit said marks to said third AND gate, second one time slot delay means connected to receive negative input marks and to transmit said marks to said fourth AND gate, a bipolar violation detector connected to receive the output signals from said third and fourth AND gates, third gating means connected to receive said input pulse train and the output signal from said bipolar violation detector and to generate an output mark only when an input mark is present and there is no output from said bipolar violation detector, and regenerator means connected to the output of said third gating means.

References Cited

UNITED STATES PATENTS 3,061,814 10/1962 Crater ------------ 340—146.1

MAYNARD R. WILBUR, *Primary Examiner.*

M. K. WOLENSKY, *Assistant Examiner.*

U.S. Cl. X.R.

340—347